United States Patent
Huang et al.

(10) Patent No.: US 10,345,634 B2
(45) Date of Patent: Jul. 9, 2019

(54) DISPLAY APPARATUS

(71) Applicant: Wistron Corp., New Taipei (TW)

(72) Inventors: Wei-Chia Huang, New Taipei (TW); Liang Yang, New Taipei (TW); Liang Tang, New Taipei (TW); Yao-Chen Yang, New Taipei (TW); Chih Chou Chou, New Taipei (TW); Guang Guo Cheng, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 15/709,378

(22) Filed: Sep. 19, 2017

(65) Prior Publication Data

US 2018/0321541 A1 Nov. 8, 2018

(30) Foreign Application Priority Data

May 4, 2017 (CN) .......................... 2017 1 0308393

(51) Int. Cl.
*G02F 1/1333* (2006.01)
*F21V 8/00* (2006.01)

(52) U.S. Cl.
CPC ....... *G02F 1/133308* (2013.01); *G02B 6/009* (2013.01); *G02B 6/0088* (2013.01); *G02B 6/0091* (2013.01); *G02B 6/0068* (2013.01); *G02B 6/0083* (2013.01); *G02F 2001/133314* (2013.01)

(58) Field of Classification Search
CPC .................................................... G02B 6/009
See application file for complete search history.

(56) References Cited

U.S. PATENT DOCUMENTS

| 2006/0139889 | A1* | 6/2006 | Lin | G02F 1/133308 361/715 |
| 2007/0139579 | A1* | 6/2007 | Zhang | G02F 1/133308 349/58 |
| 2009/0244821 | A1* | 10/2009 | Hasegawa | G02F 1/133308 361/679.01 |
| 2011/0292315 | A1* | 12/2011 | Bae | G02B 6/0088 349/58 |
| 2013/0027965 | A1* | 1/2013 | Noh | G02F 1/133385 362/602 |
| 2014/0002969 | A1* | 1/2014 | Hwang | H05K 5/0017 361/679.01 |
| 2015/0228666 | A1* | 8/2015 | Paolini, Jr. | H01L 27/3255 257/72 |
| 2016/0062523 | A1* | 3/2016 | Jeong | G02F 1/133308 349/12 |
| 2017/0168226 | A1* | 6/2017 | Jo | G02F 1/133385 |
| 2018/0173032 | A1* | 6/2018 | Suga | G02F 1/1333 |

FOREIGN PATENT DOCUMENTS

TW M513549 U 12/2015

* cited by examiner

*Primary Examiner* — Sang V Nguyen (57) ABSTRACT

A display is provided. The display includes a metal back plate, a plastic frame, a backlight optical module and a liquid-crystal module. The metal back plate includes a plurality of metal wedging portions and a first side. The plastic frame is combined with the metal back plate by injection molding. The plastic frame includes a plurality of plastic wedging portions. The plastic wedging portions wedge the metal wedging portions. The plastic frame defines a recess on the first side of the metal back plate. The backlight optical module is disposed in the recess. The liquid-crystal module covers the backlight optical module and is connected to the plastic frame.

8 Claims, 8 Drawing Sheets

DISPLAY APPARATUS

CROSS REFERENCE TO RELATED APPLICATIONS

This Application claims priority of China Patent Application No. 201710308393.6, filed on May 4, 2017, the entirety of which is incorporated by reference herein.

BACKGROUND OF THE INVENTION

Field of the Invention

The present invention relates to a display, and in particular to a display with small dimensions.

Description of the Related Art

Figure 1:
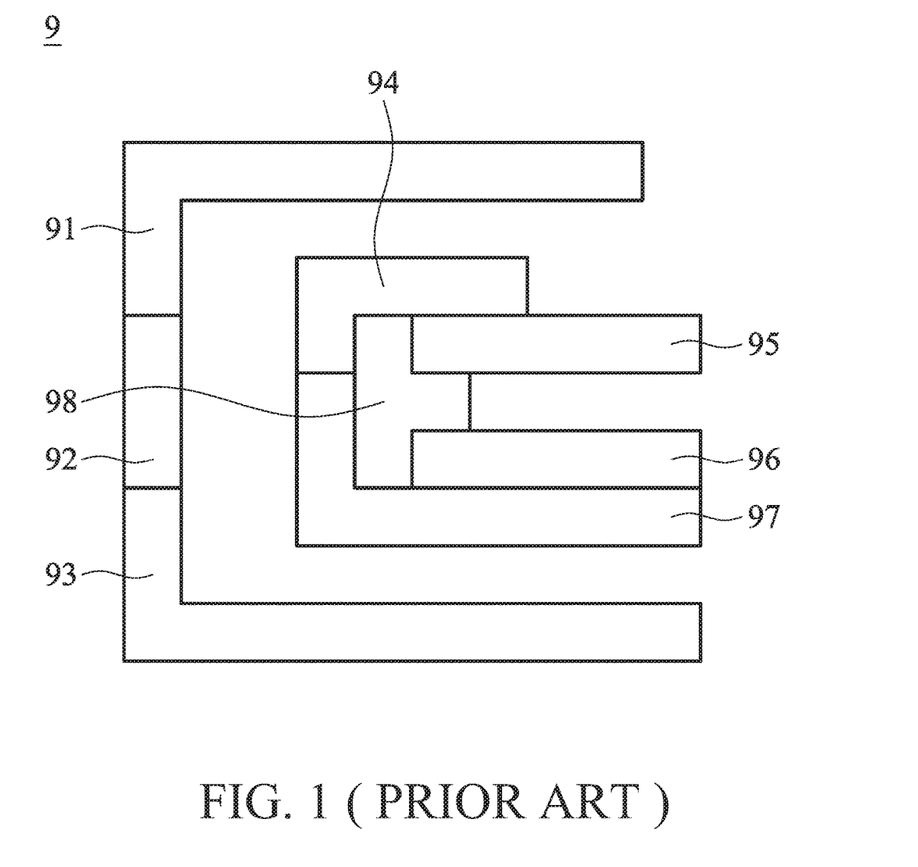
FIG. 1 shows a conventional display.

FIG. 1 shows a conventional display 9 including an outer front frame 91, an apparent central frame 92, a rear housing 93, a metal front frame 94, a liquid-crystal module, a backlight module 96, a panel supporter 97 and a panel frame 98. The metal front frame 94, the liquid-crystal module, the backlight module 96, the panel supporter 97 and the panel frame 98 are covered by the apparent front frame 91, the apparent central frame 92 and the rear housing 93. The need to reduce the thickness and weight of displays is increasingly urgent. However, it is difficult to reduce the thickness and weight of conventional displays any further than the prior art.

BRIEF SUMMARY OF THE INVENTION

In one embodiment, a display is provided. The display includes a metal back plate, a plastic frame, a backlight optical module and a liquid-crystal module. The metal back plate includes a plurality of metal wedging portions and a first side. The plastic frame is combined with the metal back plate by injection molding. The plastic frame includes a plurality of plastic wedging portions. The plastic wedging portions wedge the metal wedging portions. The plastic frame defines a recess on the first side of the metal back plate. The backlight optical module is disposed in the recess. The liquid-crystal module covers the backlight optical module and is connected to the plastic frame.

In one embodiment, the liquid-crystal module is attached to the plastic frame.

In one embodiment, the plastic frame is a stair-shaped structure. The plastic frame comprises a connection surface and an outer surface. The liquid-crystal module is attached to the connection surface. The liquid-crystal module comprises a display surface. The display surface and the outer surface are in the same level.

In one embodiment, the display further includes a circuit board. The circuit board is disposed on a second side of the metal back plate, and the first side is opposite to the second side.

In one embodiment, the display further includes a rear housing. The rear housing is directly connected to the plastic frame, and the circuit board is located between the metal back plate and the rear housing.

In one embodiment, the display further includes a circuit board shield. The circuit board shield is affixed to the metal back plate and covers the circuit board.

In one embodiment, the metal back plate comprises a first edge, a second edge, a third edge and a fourth edge. The second edge is located between the first edge and the third edge. The second edge is parallel to the fourth edge. The metal wedging portions are formed on the first edge, the second edge and the third edge.

In one embodiment, the display further includes a light source fixing member. The metal back plate comprises a plurality of metal securing portions formed on the fourth edge. The light source fixing member is secured to the metal securing portions.

In one embodiment, the display further includes a light source. A positioning groove is formed by the light source fixing member. The light source is disposed in the positioning groove. The backlight optical module comprises a light guide. The light guide is partially inserted into the positioning groove.

In one embodiment, the display further includes a rear housing and a lower cover. The lower cover is affixed to the fourth edge. The rear housing is directly connected to the plastic frame and is directly connected to the lower cover.

In the embodiment of the invention, the plastic frame is combined with the metal back plate by injection molding. Therefore, the plastic frame is tightly combined with the metal back plate with small dimension. The plastic frame covers and fastens the backlight optical module. The plastic frame also fastens the liquid-crystal module and the rear housing. Therefore, in the display of the embodiment of the invention, the plastic frame and the metal back plate connect and fasten the other elements of the display. The apparent front frame and the apparent central frame of the conventional design are omitted, thereby reducing the dimensions of the display. Utilizing the display of the embodiment of the invention, the number of required elements is decreased, the elements (such as the liquid-crystal module and the rear housing) are properly fastened by the plastic frame and the metal back plate, and the dimensions of the display are decreased.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
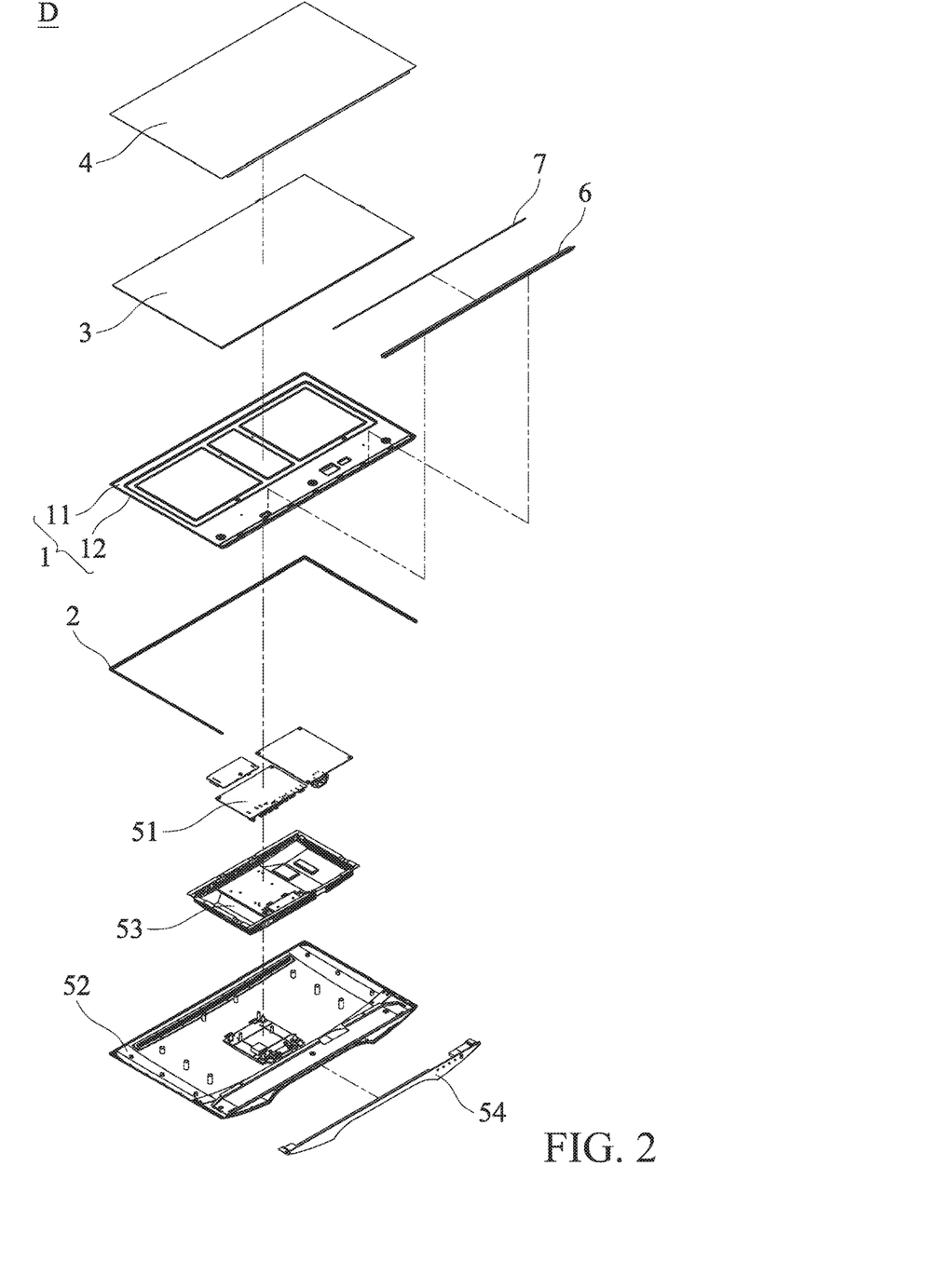
FIG. 2 is an exploded view of a display of an embodiment of the invention.
Figure 3A:
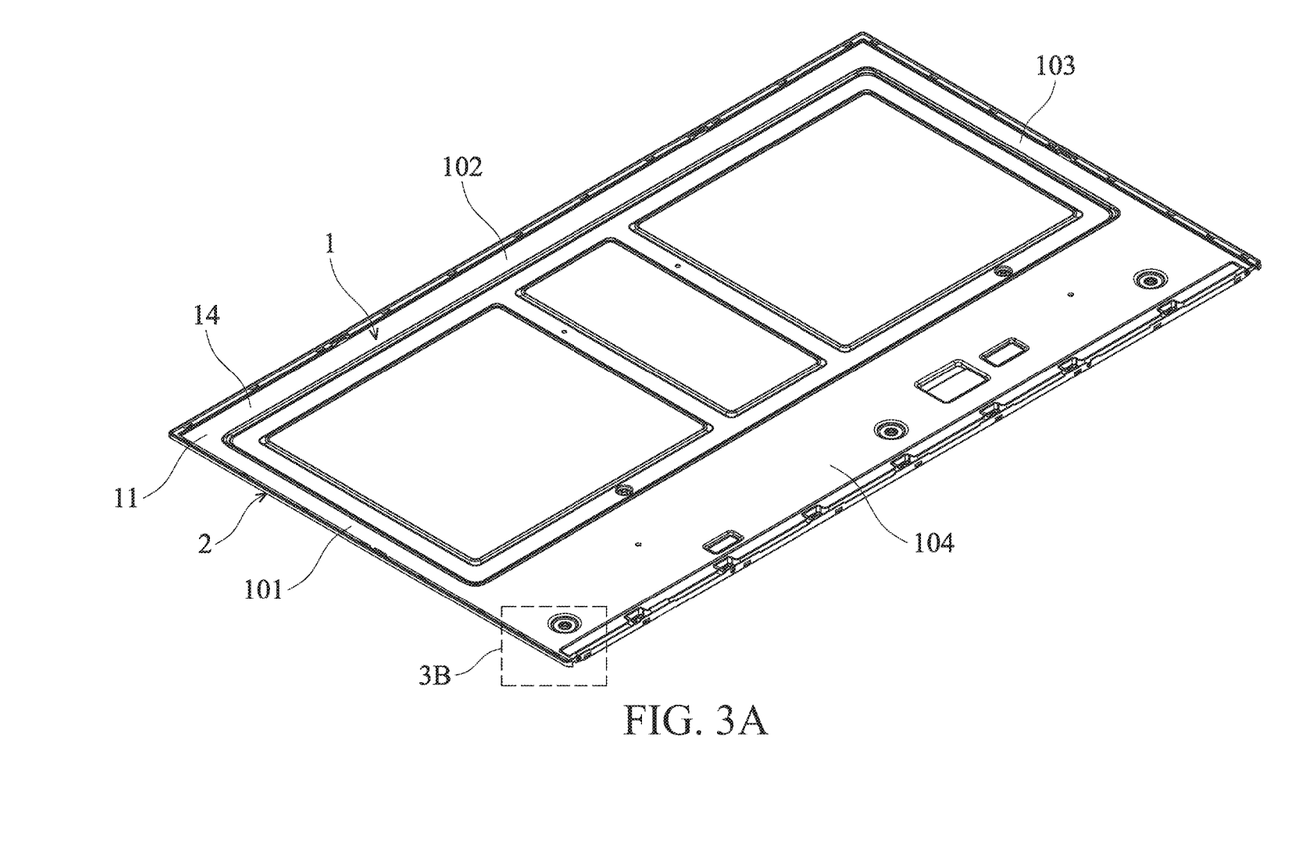
FIG. 3A shows a metal back plate being combined with a plastic frame of the embodiment of the invention.
Figure 3B:
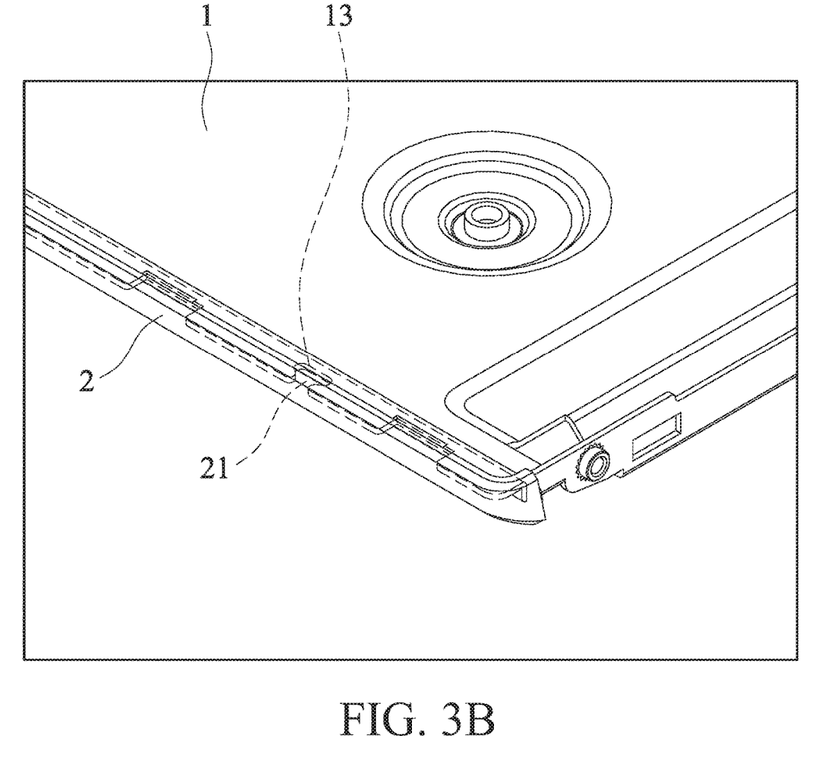
FIG. 3B is an enlarged view of the portion 3B of FIG. 3A.
Figure 4:
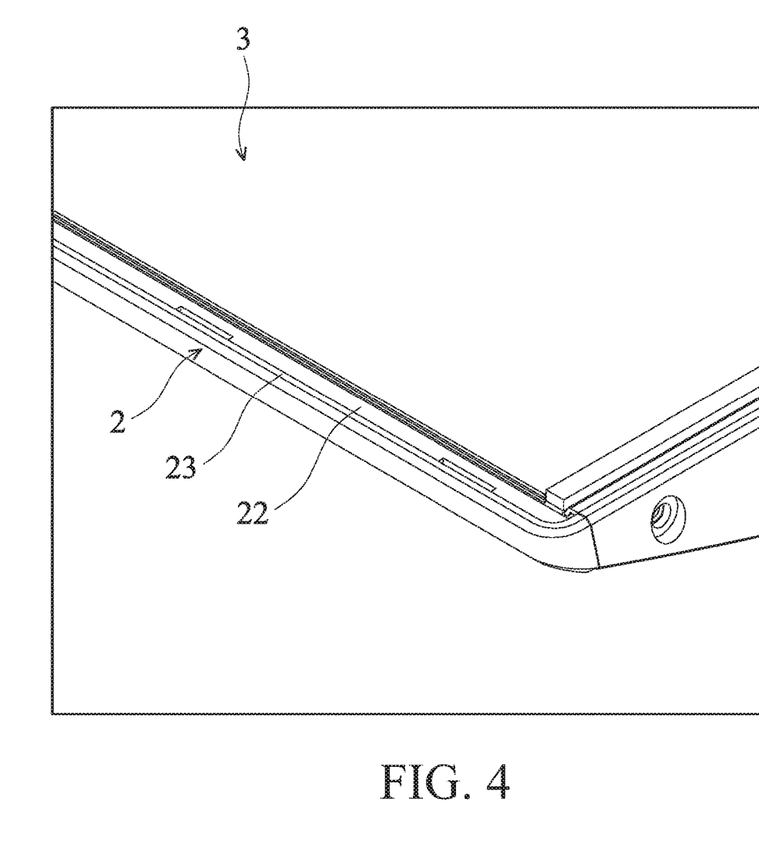
FIG. 4 shows a backlight optical module being combined with the metal back plate and the plastic frame of the embodiment of the invention.
Figure 5:
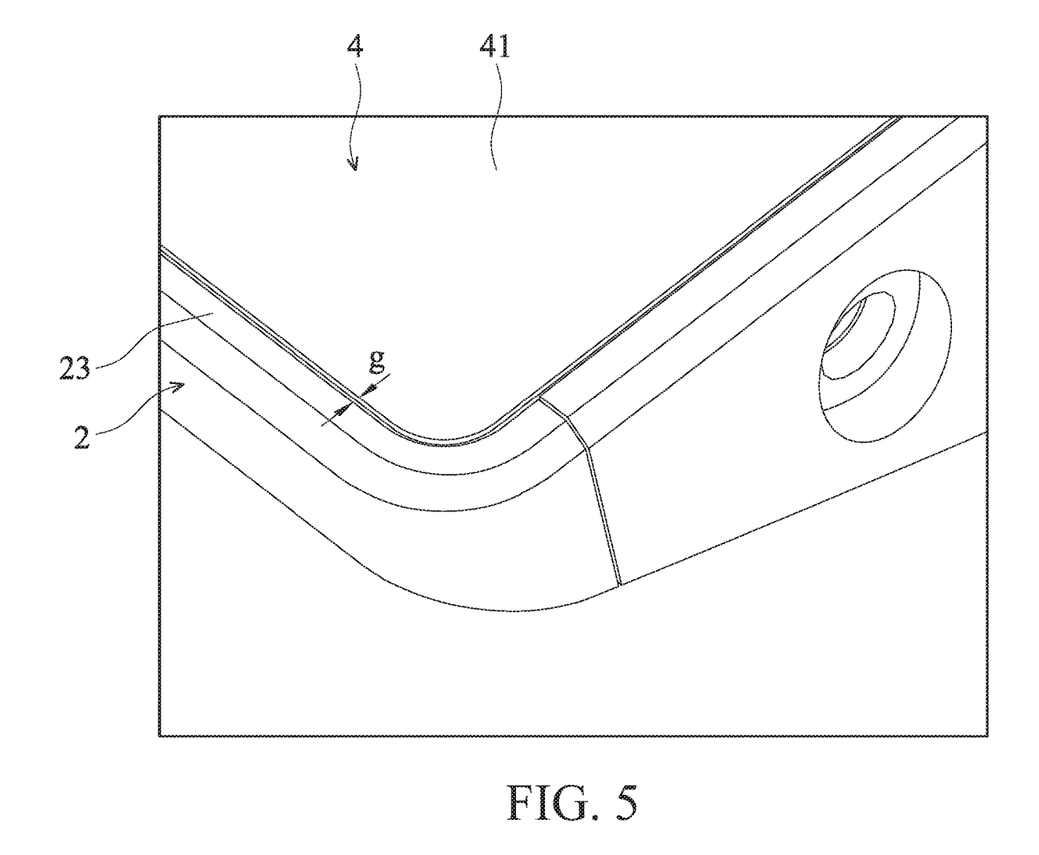
FIG. 5 shows a liquid-crystal module covering the backlight optical module of the embodiment of the invention.

FIG. 2 is an exploded view of a display D of an embodiment of the invention. The display D includes a metal back plate 1, a plastic frame 2, a backlight optical module 3 and a liquid-crystal module 4. FIG. 3A shows the metal back plate 1 combined with the plastic frame 2. FIG. 3B is an enlarged view of a portion 3B of FIG. 3A. With reference to FIGS. 3A and 3B, the metal back plate 1 includes a plurality of metal wedging portions (concave portions) and a first side 11. The plastic frame 2 is combined with the metal back plate 1 by injection molding. The plastic frame 2 includes a plurality of plastic wedging portions (convex portions) 21. The plastic wedging portions 21 wedge the metal wedging portions 13. With reference to FIGS. 3A and 4, the plastic frame 2 defines a recess 14 on the first side 11 of the metal back plate 1. The backlight optical module 3 is disposed in the recess 14. With reference to FIG. 5, the liquid-crystal module 4 covers the backlight optical module 3 and is connected to the plastic frame 2.

In the embodiment above, the metal wedging portions 13 are concave portions, and the plastic wedging portions 21 are convex portions. The disclosure is not meant to restrict the invention. In another embodiment, the metal wedging portions 13 can be convex portions, and the plastic wedging portions 21 can be concave portions. Additionally, the shapes of the metal wedging portions 13 and the plastic wedging portions 21 can also be modified.

With reference to FIGS. 4 and 5, in one embodiment, the liquid-crystal module 4 is attached to the plastic frame 2. For example, the liquid-crystal module 4 can be attached to the plastic frame 2 using double-sided adhesive or other means.

With reference to FIG. 4, in one embodiment, the plastic frame 2 is a stair-shaped structure. The plastic frame 2 comprises a connection surface 22 and an outer surface 23. The liquid-crystal module 4 is attached to the connection surface 22. The liquid-crystal module 4 comprises a display surface 41. The display surface 41 and the outer surface 23 are in the same level. Therefore, the display D has an improved appearance. In this embodiment, a gap g is formed between the liquid-crystal module 4 and the outer surface 23. The size of the gap g can be modified to meet requirements on appearance or assembly.

With reference to FIG. 2, in one embodiment, the display D further includes a circuit board 51. The circuit board 51 is disposed on a second side 12 of the metal back plate 1, and the first side 11 is opposite to the second side 12. In one embodiment, the display D further includes a rear housing 52. The rear housing 52 is directly connected to the plastic frame 2, and the circuit board 51 is located between the metal back plate 1 and the rear housing 52. In one embodiment, the display D further includes a circuit board shield 53. The circuit board shield 53 is affixed to the metal back plate 1 and covers the circuit board 51.

With reference to FIG. 3A, in one embodiment, the metal back plate 1 comprises a first edge 101, a second edge 102, a third edge 103 and a fourth edge 104. The second edge 102 is located between the first edge 101 and the third edge 103. The second edge 102 is parallel to the fourth edge 104. The metal wedging portions 13 are formed on the first edge 101, the second edge 102 and the third edge 103. In this embodiment, the metal wedging portions 13 are formed at equidistant positions on the first edge 101, the second edge 102 and the third edge 103. However, the disclosure is not meant to restrict the invention. The arrangement and the position of the metal wedging portions 13 can be modified.

Figure 6:
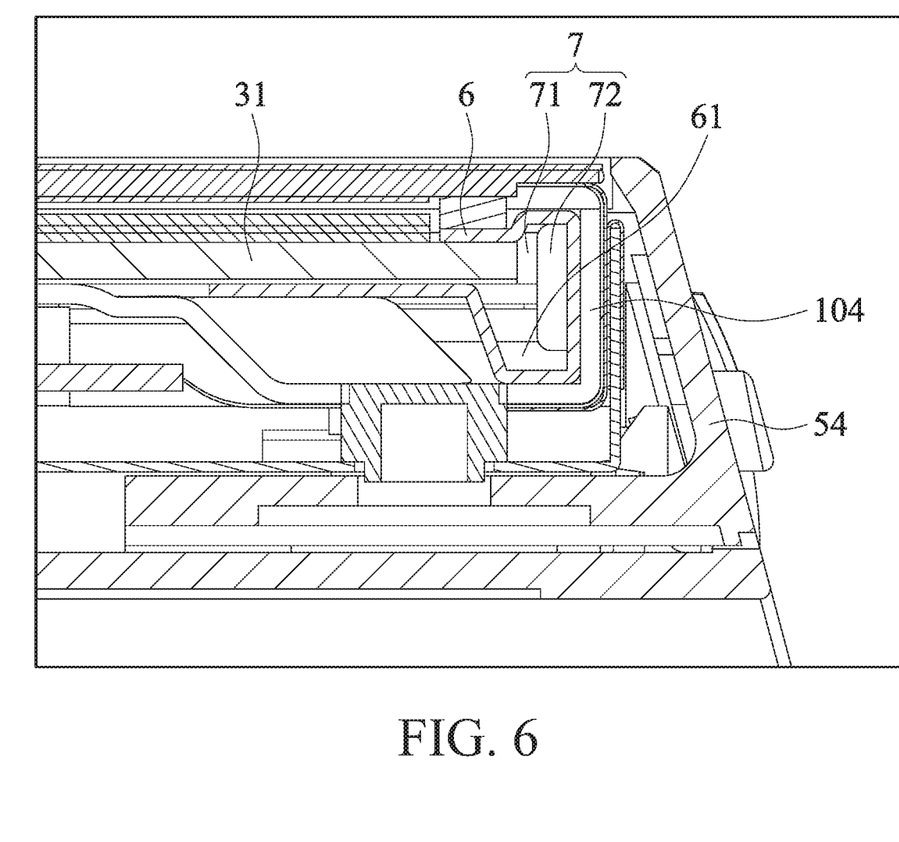
FIG. 6 is a cross sectional view of a light source fixing member of the embodiment of the invention and the neighboring structure thereof.
Figure 7:
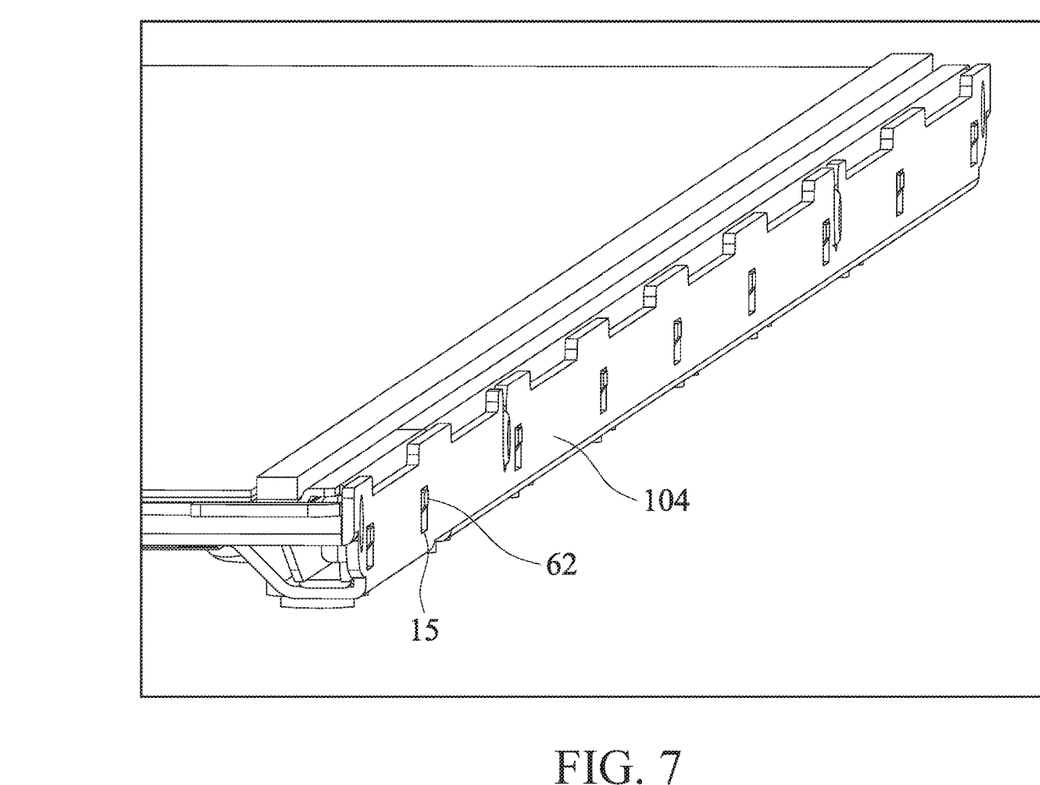
FIG. 7 shows the light source fixing member being combined with the metal back plate of the embodiment of the invention.

With reference to FIGS. 2, 6 and 7, in one embodiment, the display D further includes a light source fixing member 6. The metal back plate 1 comprises a plurality of metal securing portions 15 formed on the fourth edge 104. In this embodiment, the fourth edge 104 is a bent edge. The light source fixing member 6 is secured to the metal securing portions 15. The metal securing portions 15 can be a plurality of slots. The light source fixing member 6 can have a plurality of hooks 62. The hooks 62 are wedged to the metal securing portions (slots) 15.

With reference to FIGS. 2 and 6, in one embodiment, the display D further includes a light source 7. A positioning groove 61 is formed by the light source fixing member 6. The light source 7 is disposed in the positioning groove 61. The backlight optical module 3 comprises a light guide 31. The light guide 31 is partially inserted into the positioning groove 61. In one embodiment, the light source 7 can be a light-emitting diode strip. The light source fixing member 6 secures the position of the light source 7 relative to the light guide 31, and prevents the backlight optical module 3 from flipping. In this embodiment, the light source 7 comprises a plurality of light-emitting diode chips 71 and a flexible circuit board 72. The light-emitting diode chips 71 face the light guide 31. The material and the design of the light source 7 can be modified. The disclosure is not meant to restrict the invention.

With reference to FIGS. 2 and 6, in one embodiment, the display D further includes a lower cover 54. The lower cover 54 is affixed to the fourth edge 104. The rear housing 52 is directly connected to the plastic frame 2 and is directly connected to the lower cover 54. Therefore, the strength of the display is improved. In one embodiment, the rear housing 52 is directly wedged to the plastic frame 2, and the rear housing 52 is directly wedged to the lower cover 54.

In the embodiment of the invention, the plastic frame 2 is combined with the metal back plate 1 by injection molding. Therefore, the plastic frame 2 is tightly combined with the metal back plate 1 with small dimension. The plastic frame 2 covers and fastens the backlight optical module 3. The plastic frame 2 also fastens the liquid-crystal module 4 and the rear housing 52. Therefore, in the display of the embodiment of the invention, the plastic frame 2 and the metal back plate 1 connect and fasten the other elements of the display. The apparent front frame and the apparent central frame of the conventional design are omitted. The dimensions of the display are decreased. Utilizing the display of the embodiment of the invention, the number of required elements is decreased, the elements (such as the liquid-crystal module and the rear housing) are properly fastened by the plastic frame 2 and the metal back plate 1, and the dimensions of the display are decreased.

In one embodiment, the rear housing 52, the plastic frame 2 and the lower cover 54 are apparent elements.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
   a metal back plate, comprising a plurality of metal wedging portions and a first side, wherein the metal back plate comprises a first edge, a second edge, a third edge and a fourth edge, the second edge is located between the first edge and the third edge, the second edge is parallel to the fourth edge, and the metal wedging portions are formed on the first edge, the second edge and the third edge;
   a plastic frame, combined with the metal back plate by injection molding, comprising a plurality of plastic wedging portions, wherein the plastic wedging portions wedge the metal wedging portions, and the plastic frame defines a recess on the first side of the metal back plate;
   a backlight optical module, disposed in the recess;
   a liquid-crystal module, covering the backlight optical module and connected to the plastic frame; and
   a light source fixing member, wherein the metal back plate comprises a plurality of metal securing portions formed on the fourth edge, and the light source fixing member is secured to the metal securing portions.

2. The display as claimed in claim 1, further comprising a light source, wherein a positioning groove is formed by the light source fixing member, the light source is disposed in the positioning groove, the backlight optical module comprises a light guide, and the light guide is partially inserted into the positioning groove.

3. The display as claimed in claim 1, wherein the liquid-crystal module is attached to the plastic frame.

4. The display as claimed in claim 3, wherein the plastic frame is a stair-shaped structure, the plastic frame comprises a connection surface and an outer surface, the liquid-crystal module is attached to the connection surface, the liquid-crystal module comprises a display surface, and the display surface and the outer surface are in the same level.

5. The display as claimed in claim 1, further comprising a circuit board, wherein the circuit board is disposed on a second side of the metal back plate, and the first side is opposite to the second side.

6. The display as claimed in claim 5, further comprising a rear housing, wherein the rear housing is directly connected to the plastic frame, and the circuit board is located between the metal back plate and the rear housing.

7. The display as claimed in claim 6, further comprising a circuit board shield, wherein the circuit board shield is affixed to the metal back plate and covers the circuit board.

8. The display as claimed in claim 1, further comprising a rear housing and a lower cover, the lower cover is affixed to the fourth edge, and the rear housing is directly connected to the plastic frame and is directly connected to the lower cover.

* * * * *